(12) United States Patent  (10) Patent No.: US 7,822,759 B2
MacLaurin et al.  (45) Date of Patent: Oct. 26, 2010

(54) QUERY-DRIVEN SHARING AND SYNDICATION

(75) Inventors: Matthew MacLaurin, Woodinville, WA (US); Andrzej Turski, Redmond, WA (US); Lili Cheng, Bellevue, WA (US); Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/301,997

(22) Filed: Dec. 13, 2005

(65) Prior Publication Data

US 2007/0136244 A1  Jun. 14, 2007

(51) Int. Cl.
G06F 17/30 (2006.01)
(52) U.S. Cl. ........................ 707/758; 707/769
(58) Field of Classification Search ................. 707/758, 707/769
See application file for complete search history.

(56) References Cited

U.S. PATENT DOCUMENTS

| | | | | |
|---|---|---|---|---|
| 5,404,295 A * | 4/1995 | Katz et al. | ................... | 715/231 |
| 5,495,600 A * | 2/1996 | Terry et al. | ................... | 707/754 |
| 5,895,465 A * | 4/1999 | Guha | ........................ | 707/714 |
| 5,903,893 A * | 5/1999 | Kleewein et al. | ............ | 707/714 |
| 6,301,581 B1 * | 10/2001 | Smiley | ....................... | 707/718 |
| 6,564,219 B1 * | 5/2003 | Lee et al. | ..................... | 707/769 |
| 6,691,126 B1 * | 2/2004 | Syeda-Mahmood | ......... | 707/696 |
| 6,754,648 B1 * | 6/2004 | Fittges et al. | ............... | 707/684 |
| 6,785,672 B1 * | 8/2004 | Floratos et al. | ............. | 707/748 |
| 6,801,914 B2 * | 10/2004 | Barga et al. | ................. | 707/674 |
| 6,820,082 B1 * | 11/2004 | Cook et al. | ................. | 707/754 |
| 6,925,472 B2 * | 8/2005 | Kong | ......................... | 707/718 |
| 6,970,883 B2 * | 11/2005 | Ku et al. | ..................... | 707/752 |
| 7,082,428 B1 * | 7/2006 | Denny et al. | .................... | 707/5 |
| 7,529,723 B2 * | 5/2009 | Howard et al. | ................. | 707/1 |
| 2004/0266348 A1 * | 12/2004 | Deshpande et al. | ......... | 455/41.2 |
| 2006/0242120 A1 * | 10/2006 | Luo | .............................. | 707/3 |
| 2006/0242133 A1 * | 10/2006 | Denny et al. | ................... | 707/3 |
| 2009/0055477 A1 * | 2/2009 | Flesher et al. | ............... | 709/204 |

* cited by examiner

*Primary Examiner*—Don Wong
*Assistant Examiner*—Kim T Nguyen
(74) *Attorney, Agent, or Firm*—Lee & Hayes, PLLC (57) ABSTRACT

A unique system, user interface, and method that facilitate sharing objects in a query-based storage environment are provided. A query can be generated using metadata and the results therefrom can be obtained and shared with one or more recipients. The query and/or query results can be represented as an icon. Sharing of the query and/or query results can be accomplished in part by dragging the icon to the desired recipient. Queries can be shared as a standing query or a snapshot of the query. For standing queries, recipients can be notified when a set of query results changes. In general, queries can be saved by the user and accessed again at a later time. The user interface provides a plurality of navigation tools to facilitate the viewing of objects based on their metadata and the generation of queries.

7 Claims, 12 Drawing Sheets

QUERY-DRIVEN SHARING AND SYNDICATION

BACKGROUND

Throughout the last several years, the computing environment has changed dramatically. Early on, users could play games, write papers, generate spreadsheets and graphs, perform calculations, and save any or all parts of their work to the computer's hard drive or on some other type of storage media. As these basic operations were established, graphics and the graphical displays were enhanced to make the computing experience easier and more enjoyable for users. Computer technology continued to advance with the onset of the Internet and computer networking. Users can view, listen to, and/or download music, videos, pictures, and a variety of other documents as well as transact business over the Internet. Among the many conveniences that computer technology currently provides to users, file sharing may be one of the most popular.

Currently, files are organized into folders that are either automatically created by the computing device or manually created and customized by the user. Sharing files between users is typically done by sharing folders. However, this can be problematic because a user usually must share either the entire contents or none of the contents of the folder. In order to make finer-grained sharing decisions, the user is typically forced to make copies of files and organize them into different folders. Having multiple copies of any one file can be cumbersome for the user to manage and cause other problems with redundant document versions. Accidental copying of files between servers may be another common occurrence when sharing and/or working with folders.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system and/or methodology that facilitate sharing objects such as files between users in a query-based storage environment. This mitigates the unnecessary creation and management of redundant versions of files and folders. The system and/or methodology employ queries as the primary sharing mechanism which yields more control over files for the user. Queries can be based on any property of the object in question, including properties created by the user that allow the object to be shared. Since the same object can be returned by a plurality of queries, there is no need to create different versions of folders in order to control the sharing of such objects.

Queries can be thought of as containers whereby the contents therein may be dynamic or static. The query-based sharing mechanism can be accomplished in part by analyzing the objects according to their metadata. Metadata can include any property relevant to the object such as the object name, object type, creation date, modification date, author, extension, recipient (e.g., "To"), sender (e.g., "From"), and/or tag. When a user creates a query, the query can be run or processed and any objects satisfying the query can be returned and viewed by the user. Rather than sharing files via folders, the user can share files via queries. For example, imagine that JANE would like to share all picture files created on Jun. 14, 2005 with her sister SUE. JANE can create the appropriate query (e.g., pictures dated Jun. 14, 2005) and view the query results to verify that the files returned are those that she intends to share.

Instead of sharing a picture folder created especially for SUE and containing redundant copies of the picture files created on Jun. 14, 2005, JANE can share the query with SUE. To share a different set of pictures with her co-worker, JANE can readily enter a new query specific to such set (e.g., Dallas pictures dated Jun. 14, 2005), and then share this query. Thus, JANE can forego worrying about managing several different folders for each person with whom content is shared.

A user can create and store a plurality of queries on her desktop or elsewhere on her computing device and recall them as needed. To share a specific query (e.g., query bucket) with one or more recipients, the user can drag the desired query to recipients' names or to the appropriate icons that represent them. Furthermore, the query can be shared as either a snapshot or a standing query. A snapshot query includes only the objects that satisfy the query when shared. Any changes to the query results such as new objects that satisfy the query or existing objects that have changed in some manner but still satisfy the query are not shared with the recipient. A standing query is dynamic. That is, any changes to the query results can be shared automatically or manually with the recipient by way of updates, for example. If the owner of the standing query were to remove one or all files associated with the query or delete the query, the query on the recipient's end may be deleted as well. Thus, the owner of the query can remain in control of the standing query and/or of any objects associated therewith.

Furthermore, queries can be shared in different ways. In one approach, the user can share the query and any physical object that satisfies the query. That is, once a physical object has been shared with a recipient, that object can be placed into the recipient's storage. However, when a large number of objects or large-sized objects satisfy the query, a directory listing of metadata associated with the objects may be shared instead of the actual objects. In this case, the recipient can review the metadata list and request the desired object from the user.

As the recipient, SUE can set any number of acceptance preferences per originating user (e.g., owner of shared content) or that apply to all users equally. In general, a recipient can select to accept all queries as they are shared, to accept only directory listings when the object size or count exceeds a threshold, or to accept nothing from the originating user. Thus, the recipient is not burdened with accepting or approving each shared file before it is received. The recipient can also determine the manner in which changes to standing queries are received. For example, a notification can be sent or otherwise communicated to the recipient. Alternatively or in addition, a graphic or icon on the recipient's screen (user interface) can illuminate or become animated in some way.

Moreover, the user can essentially place objects directly into the recipient's storage without needing a gateway into their system. Because the files are shared via queries, they can be organized and managed via the queries rather than sorting them into folders and remembering where they are stored and if the particular version of the folder or object is current.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with suggesting new tags (or metadata) based on a plurality of incoming new objects. For example, when a plurality of objects are received or created by a user, such objects can be associated with one or more queries based on the tags annotated thereto. When multiple objects are selected, the system can analyze the metadata associated therewith and suggest one or more tags for the group of objects. As more objects are added to the grouping, other tags can be suggested. In addition, the system can learn which tags are the most meaningful to the user according to the metadata extracted from the objects and the user's existing tags. Inference schemes can also be used when sharing information with recipients. That is, the system can learn which queries are shared and to whom and then make recommendations to the user and/or share queries automatically to save the user time.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
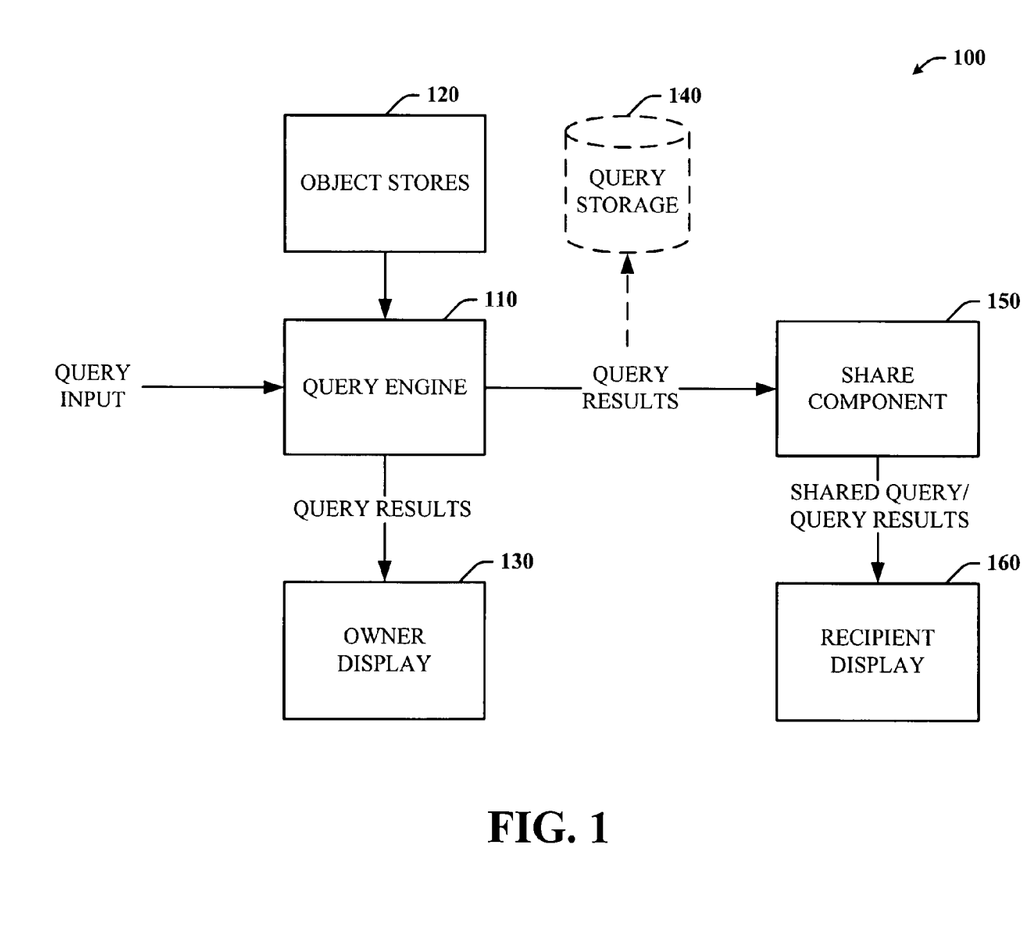
FIG. 1 is a block diagram of a query-based data management system that facilitates sharing data with other users via queries related to such data.

Referring now to FIG. 1, there is a general block diagram of a query-based data management system 100 that facilitates sharing objects with other users in a more controlled manner. The system 100 includes a query engine 110 that can process a query (e.g., query input) entered by a user (e.g., owner of the query) and can return the query results to the user. In particular, the query engine analyzes the query to determine if any objects in the one or more object stores 120 satisfy the query. The query results can be viewed by the user (owner) on the user's display 130. In addition, the query as well as the corresponding results can be saved to one or more query stores 140 that may be located on the owner's computing device, an external device, or online at a remote storage location. It should be appreciated that the object stores 120 can be stored online (e.g., Internet or intranet storage) or on the owner's computing device.

For one reason or another, the owner of the query may wish to share the objects (e.g., files such as documents, pictures, music, etc.) related to the query with at least one other user. For example, the owner may want to show his supervisor the most recent images he has created for an upcoming presentation. In addition, he may also want to share the images with the other members of his work team. Sharing the images can be accomplished in part by a share component 150. The share component 150 essentially allows the query owner to share the query and the related query results with others. Thus, multiple folders do not need to be maintained by the owner. Moreover, objects can be shared in a more controlled manner. Unlike the conventional folder-sharing practice, objects can be organized by their metadata such as through the use of tags. In particular, the objects can be stacked, selected for viewing, and/or retrieved according to their respective tags.

At least two different approaches can be taken when sharing a query. In the first, a snapshot of the query and/or query results can be shared with the recipient. That is, only the current contents of the query results are shared with the recipient and the query is not subsequently rerun for the recipient. The recipient is not notified even if the current set of query results differs from the shared set of query results. However, the originating user or owner of the query may be aware of such differences.

The second approach involves a standing or dynamic query. The standing query includes the current contents of the query results and provides updates to the query owner and the query recipient to indicate that a file has been added, modified, or discarded from the set of query results. Notification that the set of query results has changed can be made to the query owner and recipient in a variety of ways. For example, an alert can be issued by way of a pop-up window or an email. Alternatively, a portion of the respective displays can be illuminated, change color, or flash to make the owner or recipient aware of the modified set of query results. The query results may change or the content of individual objects in the query results may change—either of which can cause a notification to be communicated. The shared query and related query results can be displayed on the recipient's display 160 in accordance with the recipient's acceptance preferences.

Figure 2:
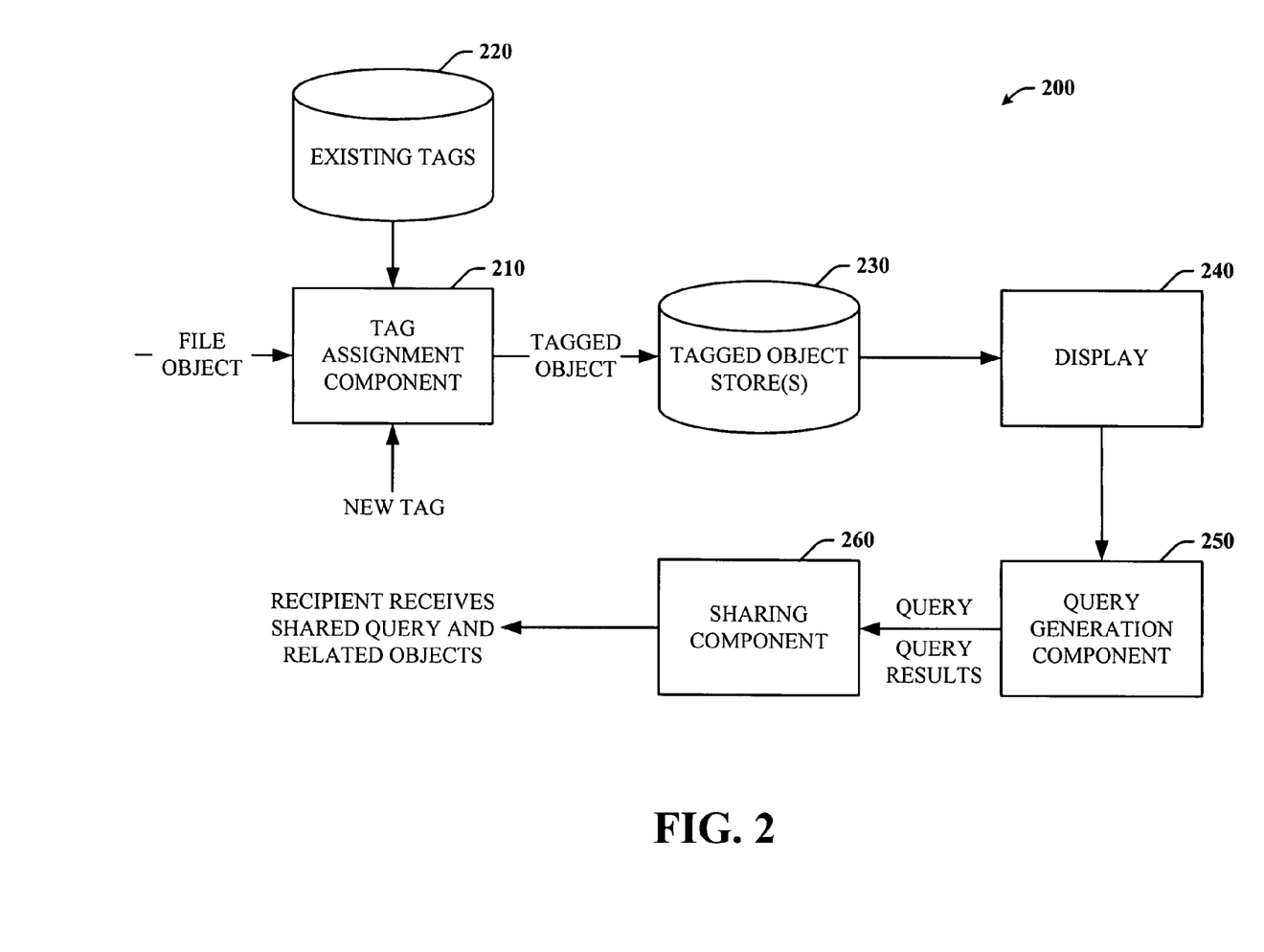
FIG. 2 is a block diagram of a query-based data management system that facilitates organizing and sharing data with other users via queries related to such data.

Turning now to FIG. 2, there is illustrated a query-based data management system 200 that facilitates organizing and sharing data with other users via queries related to such data. The system 200 can be employed in connection with a query-driven storage environment whereby queries are used to indicate which subsets of stored objects the user wants to view, share, or monitor for changes. Due to the query-centric nature of the system 200, tags, which are arbitrary strings of text, can be utilized to retrieve one or more objects stored in the system. Thus, the system includes a tag assignment component 210 that can annotate one or more objects with a selected tag. The selected tag can be chosen from a list or database of existing tags 220 or can be created by the user-owner. The new tag can be created specifically for the object and particularly for sharing the object with another user.

Through the use of tags, objects can be easily retrieved and managed, thus mitigating the need to immediately organize them into folders at the risk of losing track of them. For example, imagine that a user frequently shares pictures with her sister Nicole. Thus, objects intended to be shared with Nicole can be tagged "Nicole". Tagged objects can be stored (230) and later retrieved by clicking or selecting the desired tag. For instance, to view all existing objects shared with Nicole, the user can select the "Nicole" tag from a tag list or metadata directory. The objects associated with the selected tag can be presented to the user on a display 240.

From the display 240, the user can make use of a query generation component 250 that generates at least one query based on the user input. The query and/or the results to query can be shared with at least one recipient via a sharing component 260. The sharing component 260 essentially facilitates placing the query into the recipient's data storage. The recipient can receive the query and the related query results (e.g., physical file objects). Alternatively, the recipient may only receive or accept a directory listing of the query results or a directory of the metadata associated with the query results. This particular mode of sharing can be more practical when large files or a large number of files are shared. When a directory listing of the shared objects' metadata is sent to the recipient, the recipient can select any available object from the listing and request to obtain it from the user. Because the file objects are sent in a query-based fashion, the recipient no longer needs to file the objects into particular folders or create new folders to readily access them some time later. Rather, the recipient can leave the objects where they were received and either view them via the query or run another query to retrieve them by their metadata.

Figure 3:
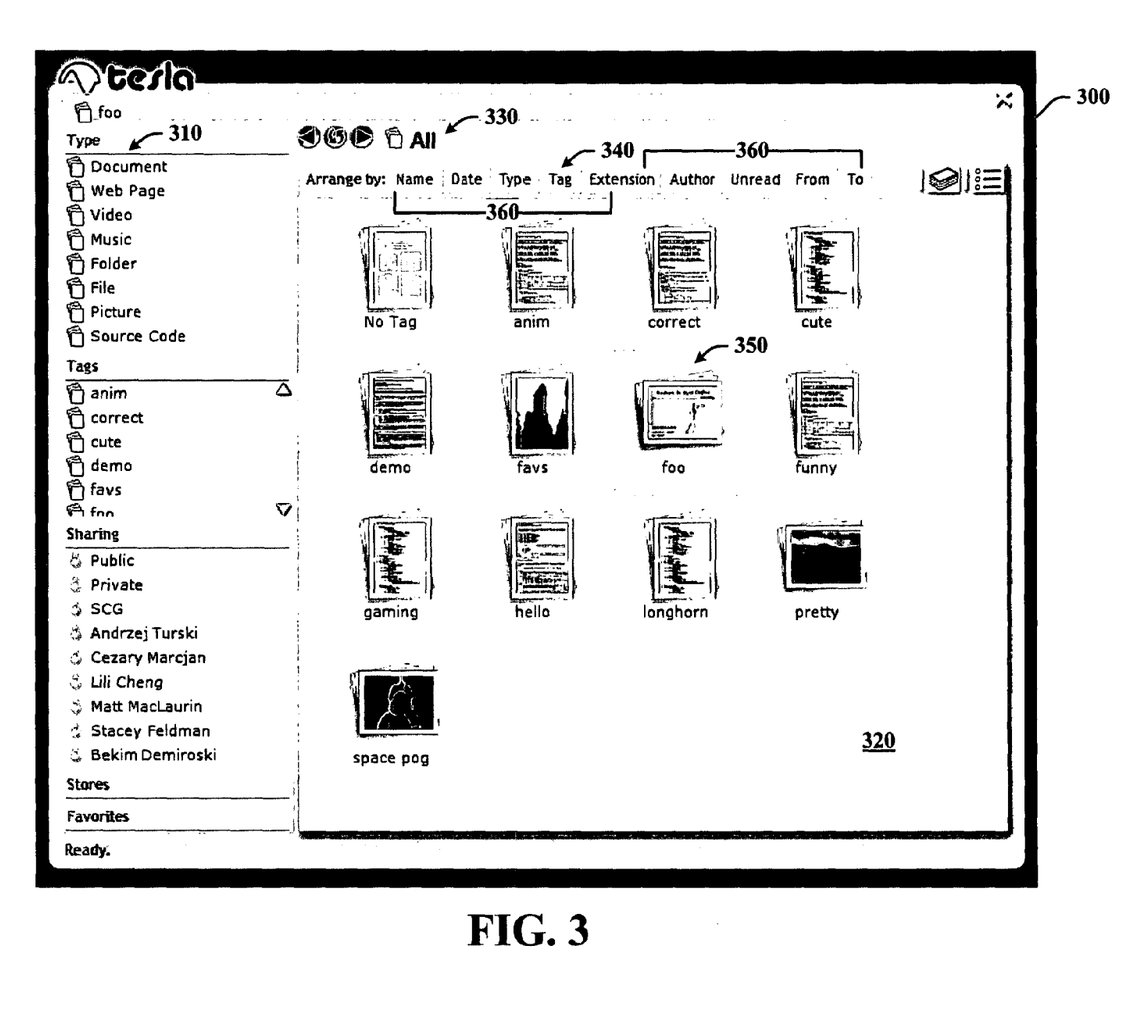
FIG. 3 is a screen capture of an exemplary user interface that can be employed to facilitate the organization, management, and sharing of data with other users in a query-based storage environment.
Figure 4:
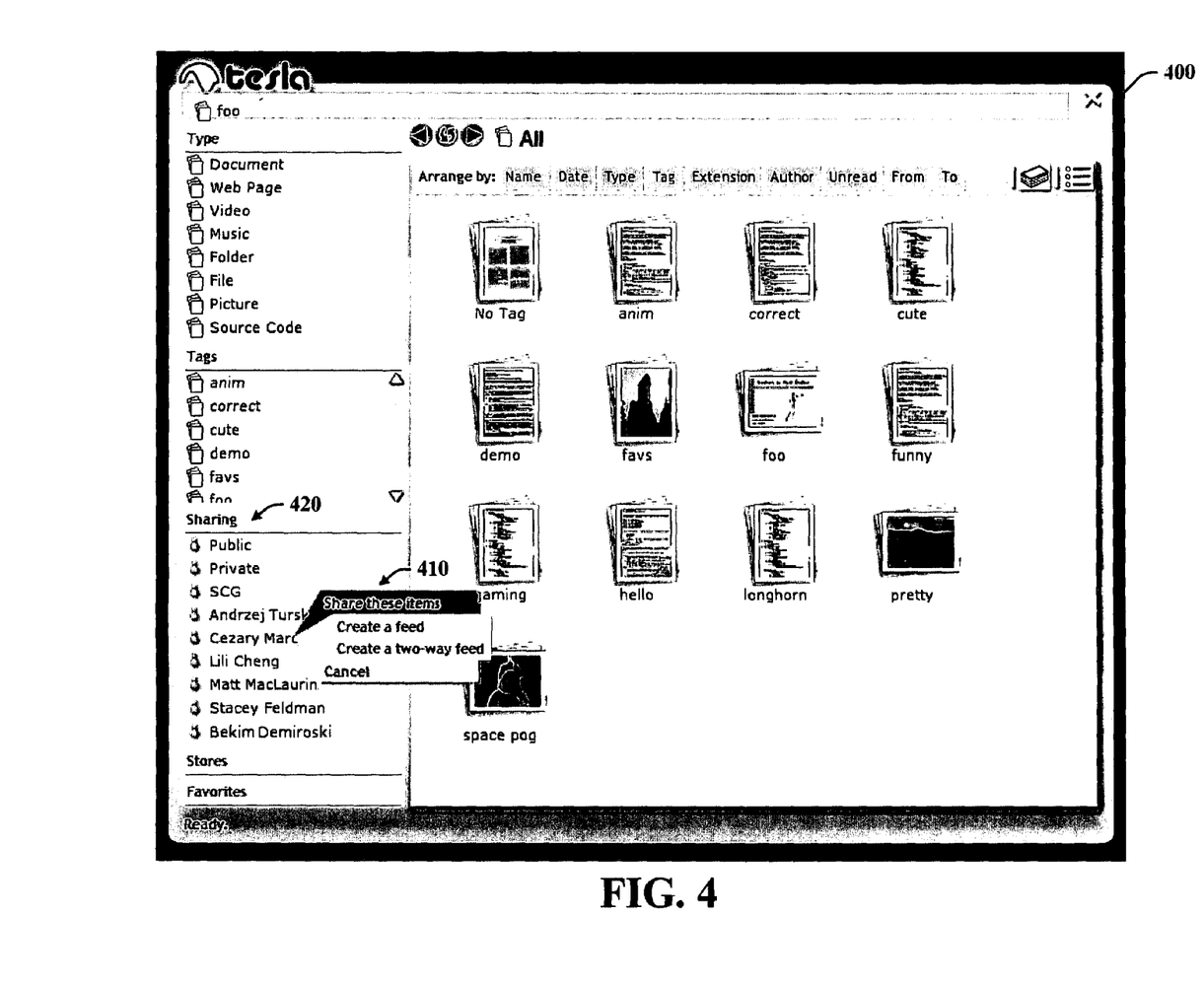
FIG. 4 is a screen capture of an exemplary user interface that can be employed to facilitate sharing one or more queries and their related objects with at least one other user in a controlled manner.
Figure 5:
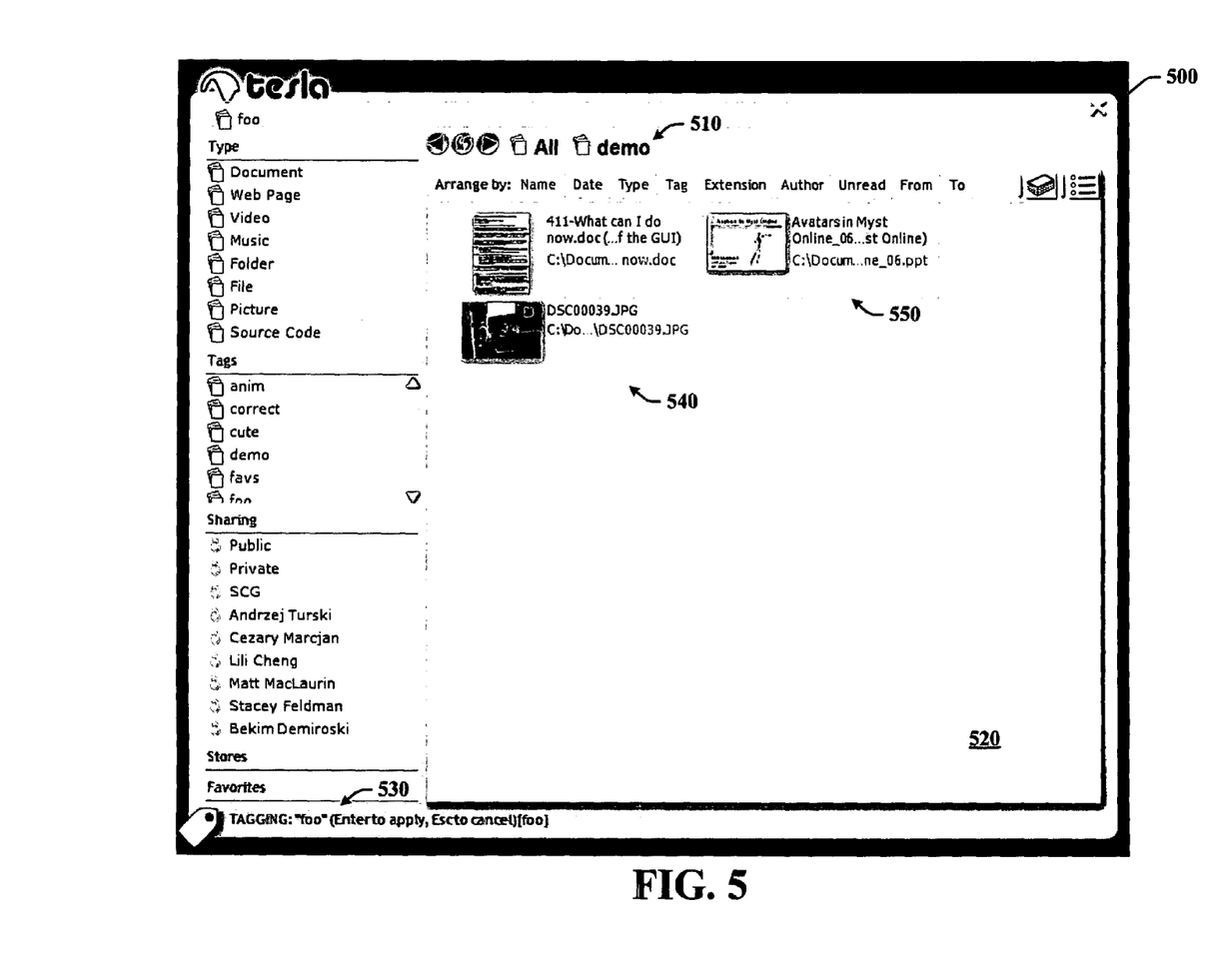
FIG. 5 is a screen capture of an exemplary user interface that can be employed to facilitate annotating objects with tags which is useful for query-based object retrieval and sharing.

Referring now to FIGS. 3, 4, and 5, there are illustrated screen shots of exemplary user interfaces that can be employed to facilitate the systems and methods described herein. It should be appreciated that while certain ways of displaying information to users are shown and described with respect to certain figures as screen shots, those skilled in the relevant art will recognize that various other alternatives can be employed. The terms "screen" and "display" are generally used interchangeably herein. The content shown on the screens or displays are stored and/or transmitted as display descriptions, graphical user interfaces, or by other methods of depicting information on a screen (whether personal computer, PDA, mobile telephone, or other suitable device, for example) where the layout and information or content to be displayed is stored in memory, database, or another storage facility.

In FIG. 3, the user interface 300 demonstrates an exemplary layout of objects organized according to one or more kinds of metadata (e.g., type, tag, etc.) as well as other navigation and viewing tools. For example, the user can view file objects by or run queries based on the type of object (310). In the main display area 320, all file objects as indicated in the query bar 330 ("All") are shown as arranged by their respective tags 340. That is, all or substantially all the objects are stacked by their respective tags. The stack 350 for tag=foo is highlighted. The objects can also be arranged and shown in the display area 320 by name, date, type, extension, author, unread status, from, and/or to as indicated on the navigation tabs 360.

The user interface 400 in FIG. 4 depicts an exemplary sharing menu 410 that can be activated by a user when sharing file objects with a recipient or computing device is desired. The sharing menu 410 can include 4 different options from which the user can choose as shown in the screen shot. However, it should be understand that any number of sharing options can be included in the sharing menu 410.

Share these items can be referred to a snapshot query whereby the user wishes to only share the current file objects included in the query results with the recipient (at least one). No further processing of the query is performed. Hence, the query is not re-run for the recipient's benefit and the recipient is not notified when the query results have changed. For example, when a new file object is added to the user's system and satisfies a query, a previous recipient of that query is not informed of the new file object.

Create a feed indicates that the user desires to share a dynamic or standing query with the recipient. That is, the recipient receives the current set of objects that satisfy the query and can also be notified when any changes to the query results of this particular query are detected. When an object enters the result set of the query, it can be automatically shared as well with no further action required by the user (query owner). Create a two-way feed is similar to Create a feed with the addition of requesting that the recipient of the shared data share any objects from their stores that match or satisfy the query with the originating user. If the originating user decides against sharing, he can cancel the share request or operation before it is initiated.

As can be seen in the figure, the sharing menu 410 has been activated by the user to share one or more selected objects with Cezary, who is listed in the user's sharing list 420. The sharing list 420 can track and/or include groups of users/ entities or individual users/entities with which the user has shared or intends to share file objects. The list 420 can be edited and/or customized by the user. The user can click on any of the names on the sharing list to view which file objects and/or which queries have been shared with the selected name.

In practice for example, the user can enter a query and obtain the query results. The query can be presented to the user as an icon or other graphic or symbol. The query results can be represented by the same icon or can be represented by a corresponding icon or graphic. To share a query with at least one other person or entity, the user can drag the query icon to the person or entity. Alternatively, the user can highlight the query icon or the file objects included in the query results and then employ a sharing menu to share the objects. When sharing with multiple users, the user can highlight the desired names and then drag and drop them onto the query icon. The reverse may be done as well whereby the query icon is dragged and dropped on the highlighted names.

The user interface 500 shown in FIG. 5 illustrates a tag annotation operation. According to the user interface 500, the query for the "demo" objects appears in the query bar 510 and the corresponding query results are shown in the display area 520. More specifically, there are three file objects that satisfy this query. Now the user desires to tag two of the objects 540, 550 (highlighted) with "foo"—as indicated in the status bar 530. Thus, these objects 540, 550 have at least two tags associated therewith: demo and foo—and therefore can satisfy multiply queries. Multiple objects can be annotated at the same time by dragging and dropping them to the appropriate tag name. Alternatively, the selected objects can be annotated manually with a tag.

Figure 6:
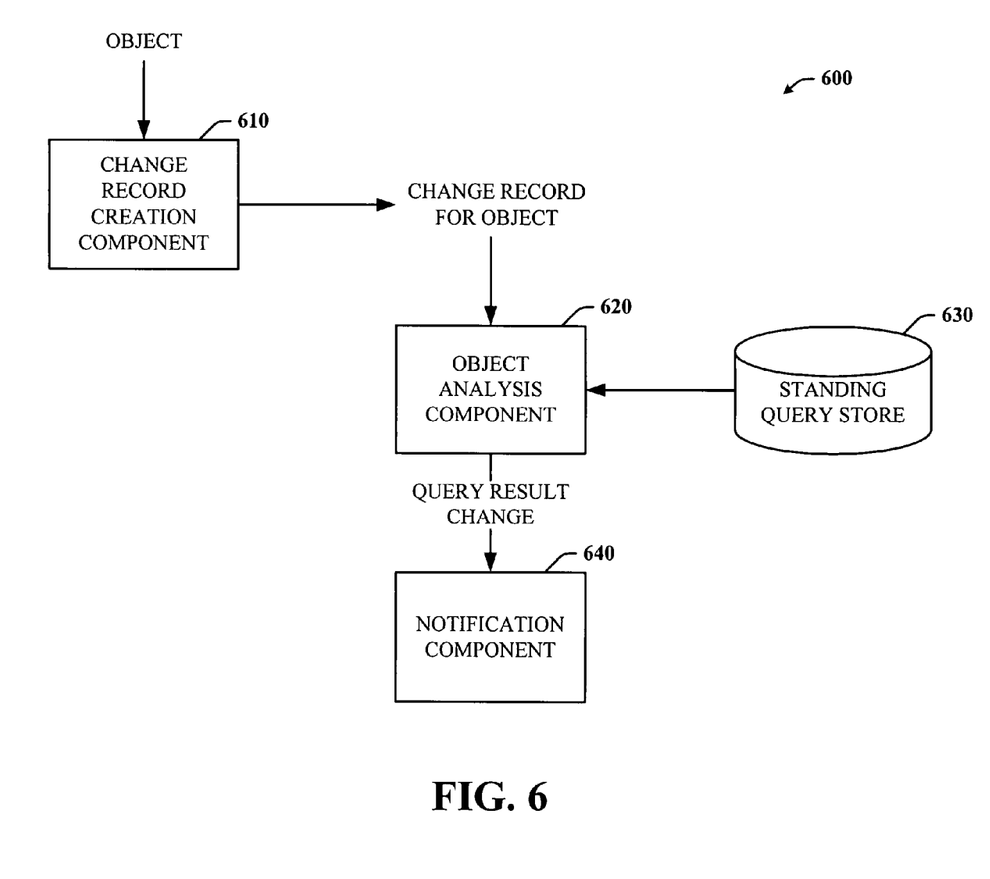
FIG. 6 is a block diagram of a query-based data management system that facilitates notifying a user when a new, discarded, or changed object may affect one or more standing queries.

Turning now to FIG. 6, there is illustrated a block diagram of a query-based data management system 600 that facilitates notifying users when a change to a standing query occurs. In particular, the system 600 can rapidly and efficiently detect when an object which did not previously satisfy a query subsequently begins to match or satisfies the query. For example, suppose a user wants to know when incoming objects satisfy an existing query. Conventional practice requires the query to be run over and over again and with each run of the query, a determination is made as to whether the query results changed from the previous run. As a result, the database constantly runs which can consume limited system resources and is usually very inefficient.

The subject system 600 mitigates the need to re-run queries in this manner. Rather, when an object is created, destroyed, changed or arrives from another store, a change record is created. The change record captures the initial state of the object before any change is applied. In the subject system 600, an indexer (not shown) extracts metadata from each new incoming object that is received into storage and builds indices in the database to facilitate later retrieval of the object. When new objects come in or when the state of an object changes, the object is re-indexed. For objects that existed in storage already, the metadata present before any changes occurred can be packaged into a change record and noted as the initial state of the object. For all objects, the terminal state of the object is packaged as well. The change record can be made by a change record creation component 610.

The change record, including both the initial and terminal states, can be tested by way of an object analysis component 620 against each standing query (as stored in one or more standing query stores 630). Because both the initial and terminal states are calculated once and kept in memory, the system 600 can determine whether the change causes the object to enter the result set of the query, causes the object to leave the result set of the query, or changes the object without causing a transition (e.g., the object still remains or still is left out of the result set of the query). If a change has occurred, the user can be notified via a notification component 640. In practice, users can share as well as unshare objects particularly in the case of standing queries. Objects can be unshared by making the standing query more restrictive thus removing one or more objects from the set of query results.

Shared queries and/or their objects can be modified by the recipient. When modification by the recipient occurs, new queries or objects are created and presumably owned by the person who created it. The originating user may still retain the query in its original format and may never even know that the recipient customized the query or any of the related objects—that is unless the recipient decides to share the "new" or modified queries or objects.

As an aside, whenever changes to the membership of a standing query are detected in this manner, further action can be taken. In the case of sharing as described hereinabove, the object can be shared or the sharing may cancelled. In other cases, the user may be notified of the change through a user interface signal; the object may be backed up or deleted, etc.

Figure 7:
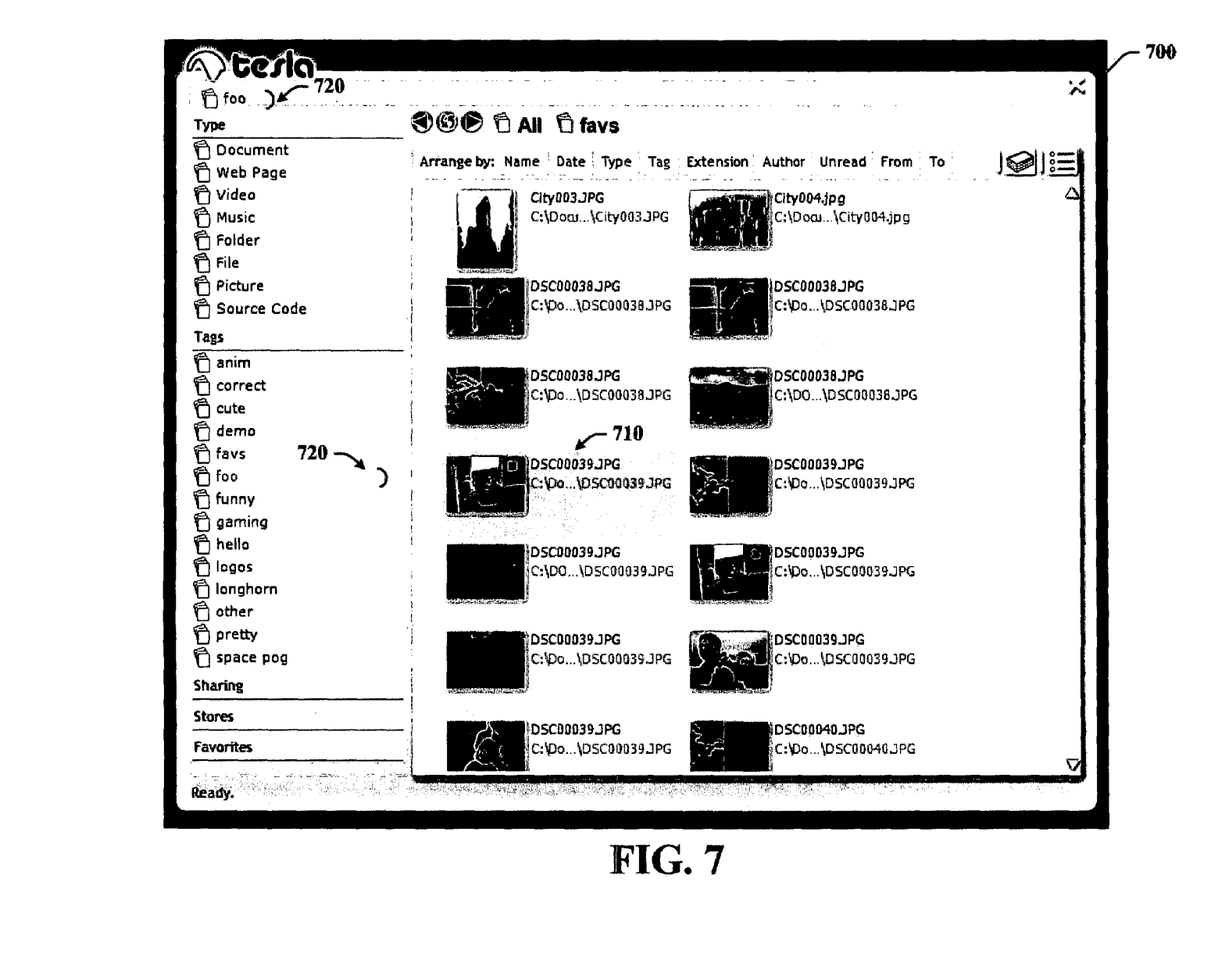
FIG. 7 is a screen capture of an exemplary user interface that can be employed to facilitate notifying a user that an object has been added to a query.

Turning now to FIG. 7, there is demonstrated an exemplary user interface 700 for a query-based data management system that facilitates notifying a user that an object 710 in the "favs" tag grouping has been added. Alternatively, the object 710 may have been modified. To notify the user that at least one object has been annotated with a tag (tag=foo), a graphical symbol or icon can be employed as shown in the figure. Here, a partially illuminated circle (720) indicates that the particular tag has changed in some way. This circle 720 provides a lightweight eye or monitor on a particular query (e.g., tag=foo) and quickly lets the user know that a change has occurred.

Figure 8:
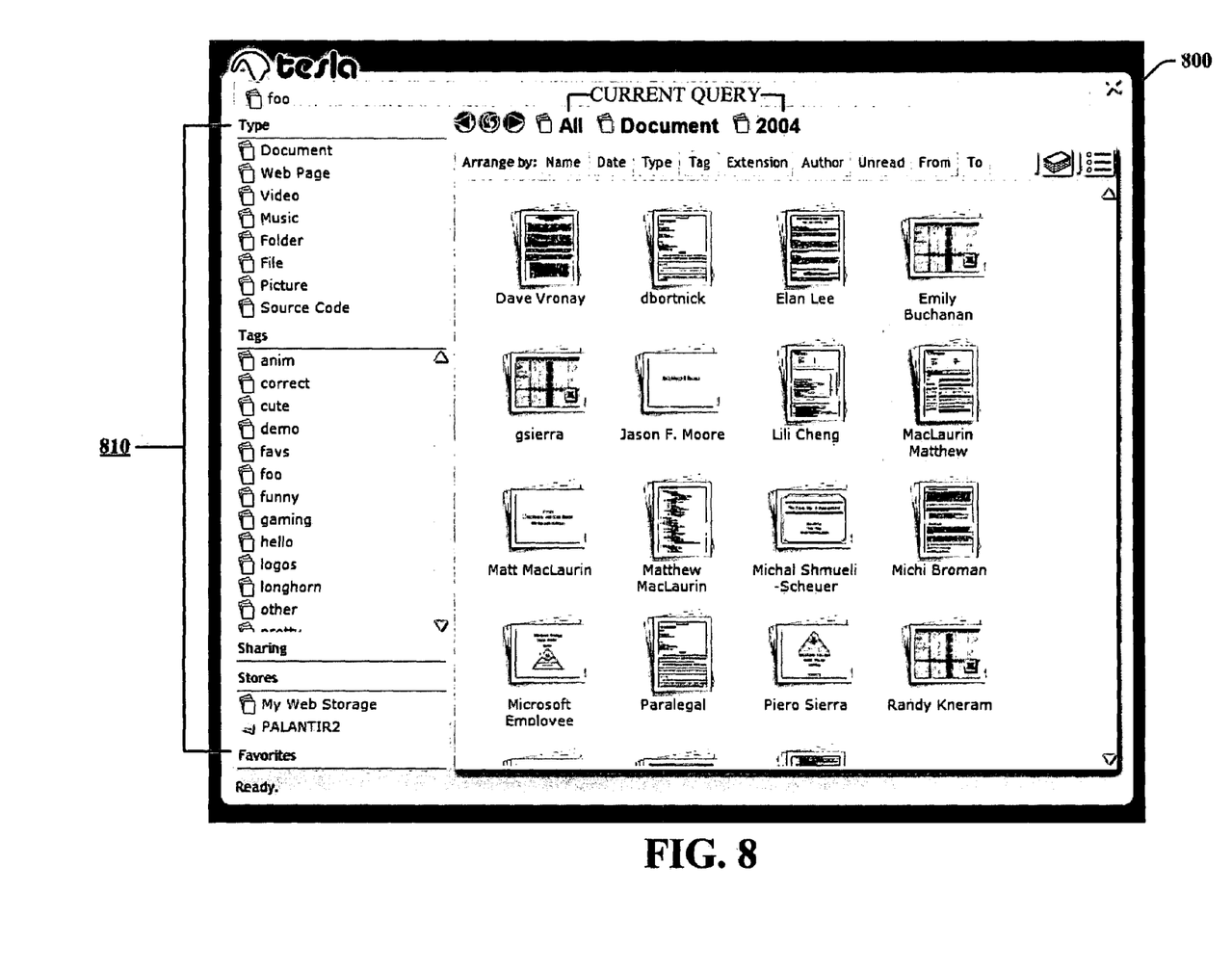
FIG. 8 is a screen capture of an exemplary user interface that can be employed to facilitate generating queries and viewing query results.

In FIG. 8, the user interface 800 displays a set of results for the query "All—documents—2004" which can be read as "all 2004 documents". The documents are stacked and arranged by author. For example, documents created and/or modified in 2004 that are authored by Matthew MacLaurin can be shared with one or more recipients. The user interface 800 also shows that other storage mechanisms that are online or located on other devices can be accessed and managed as well from this display.

A new query can be generated by using one or more of the onscreen navigation tools 810 and/or by clearing the query bar. New information can be entered in the query bar by clicking on the viewable tools 810, by dragging and dropping one or more metadata to the query bar, or by manually entering the relevant query terms. When multiple queries or multiple metadata (e.g., of the same type) are dragged to the query bar, they can be processed using the OR conjunction. For example, if a user drags "documents" and "pictures" (e.g., object type metadata) to the query bar, the query will process "documents or pictures". In addition to "types" and "tags", various other metadata can be viewed on the user's screen as well. To view different or additional metadata, the user can select the desired metadata from a metadata list or directory.

Figure 9:
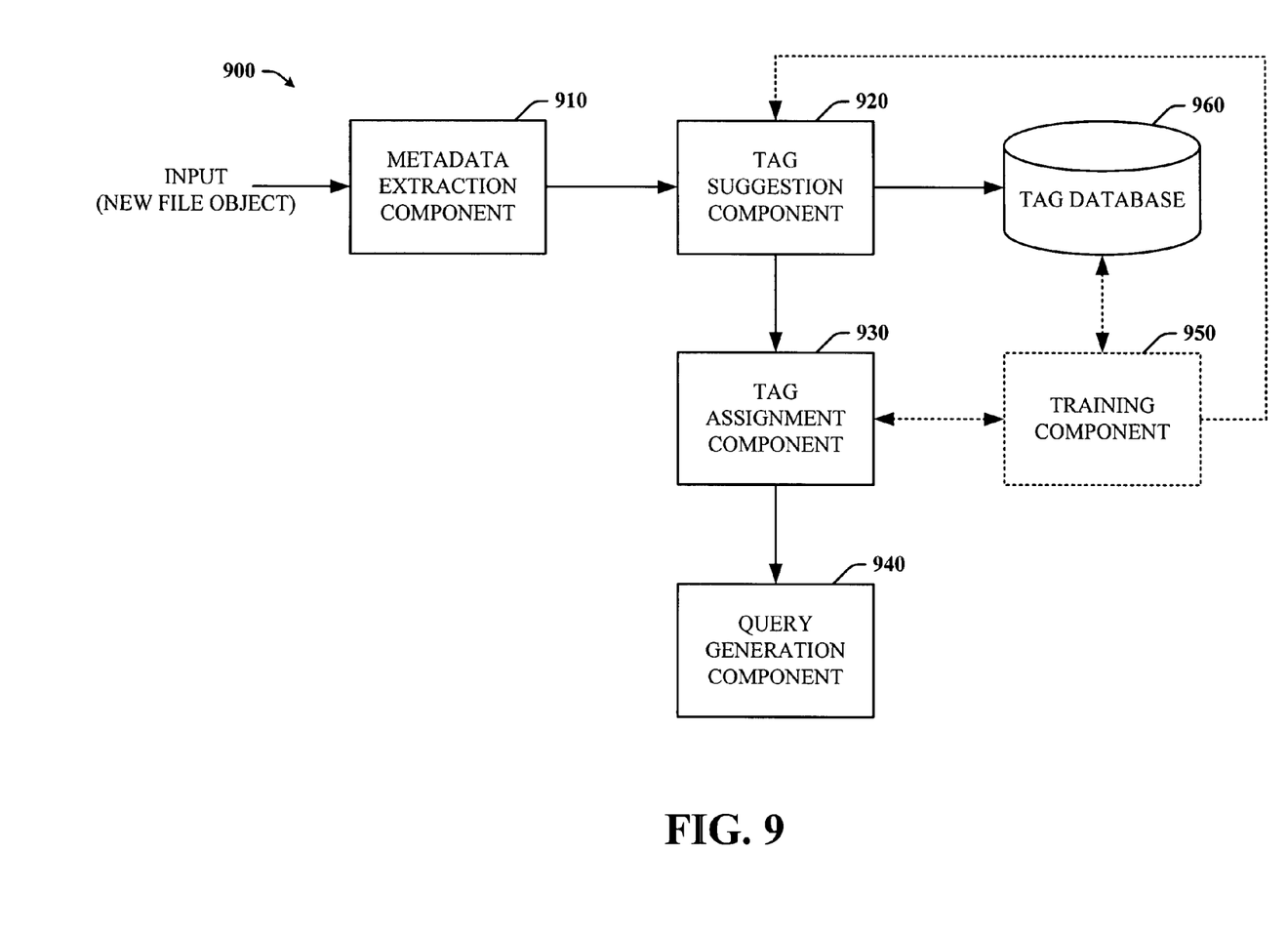
FIG. 9 is a block diagram of a query optimization system that can be trained to generate and/or enhance queries based on metadata extracted from a plurality of objects.

Moving on to FIG. 9, there is a query-based data management system 900 that employs inferences as well as training techniques in order to optimize query generation and data management. The system 900 includes a metadata extraction component 910 that can extract metadata from a new file object that has entered the system. The file object may have been created by the user or received from an external source. The metadata can be communicated to a tag suggestion component 920. The tag suggestion component may recommend any number of tags that would be the most suitable for the object given the user's explicit or implicit preferences. The user can select a tag from the suggestions provided or use a different one. A tag assignment component 930 annotates the appropriate tag to the file object and the tagged object can be made available to a query generation component 940.

The annotated tag can be communicated to a training component 950. The training component collects and analyzes the tags that are selected by the user to learn the user's behavior and preferences. The training component 950 can also evaluate the existing tags stored in a tag database 960 to facilitate improving tag recommendations. Furthermore, the training information can be employed to automatically tag incoming objects, thus making data management of new objects more seamless and transparent to the user.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 10:
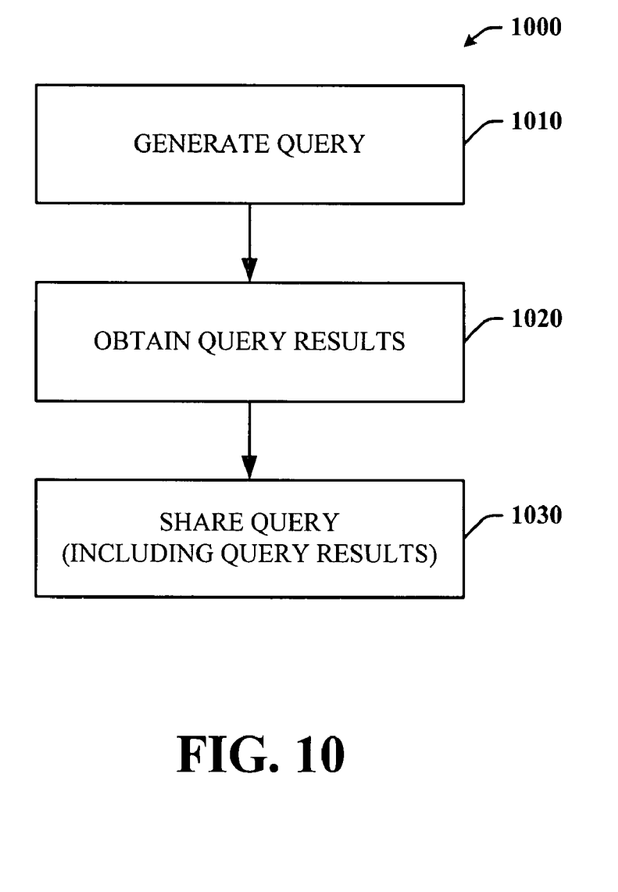
FIG. 10 is a flow chart illustrating an exemplary methodology that facilitates sharing objects via queries.

Referring to FIG. 10, there is illustrated a flow diagram of a query-based methodology 1000 that facilitates sharing file objects between users in a controlled manner. The method 1000 involves generating a query at 1010. This can be accomplished in part by using one or more navigational tools available onscreen to the user. For example, the user can select and click on the desired metadata to include in the query. Alternatively, the user can drag the desired metadata to the query bar. To begin a new query, onscreen commands can clear or reset the query bar. The query can be processed and at 1020, the query results can be obtained. Optionally, the query and/or query results can be saved and accessed later by the user.

At 1030, the query and/or the query results can be shared with at least one recipient. In practice, for example, the query and/or the query results can be represented by an icon or other symbol. The user can drag the icon to the recipient's name or to a symbol representing the recipient to initiate the sharing of the query. The recipient can have an acceptance policy in place per user or that is the same for all users. Thus, the recipient is not burdened with approving or accepting each shared object or query. Because the shared file objects have tags and other metadata associated therewith, the recipient is also not burdened with having to file away each object as soon as it arrives. Rather, the recipient can quickly and efficiently locate the object by entering a query or by clicking on the shared query. The recipient can also modify the shared object, thereby creating a new object. The recipient becomes the owner of this new object. The recipient can also modify a shared query which effectively creates a new query that the recipient can share with others.

Figure 11:
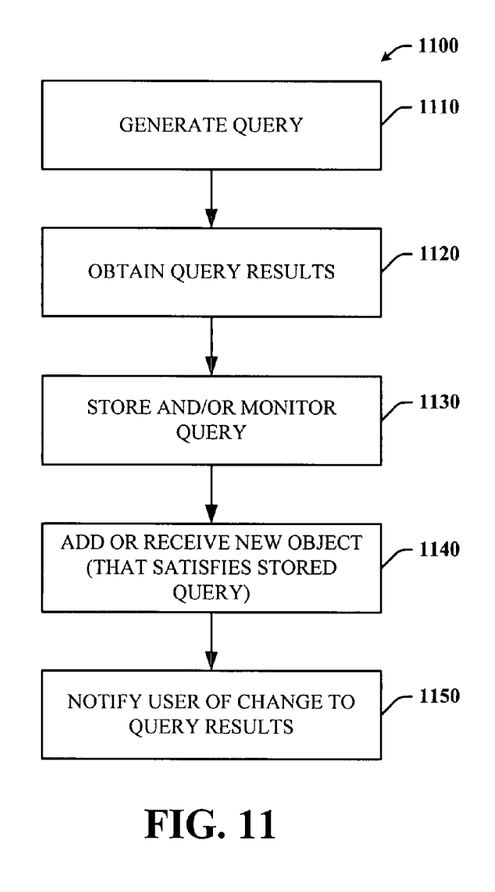
FIG. 11 is a flow chart illustrating an exemplary methodology that facilitates notifying a user that a standing query has been modified or changed in some way.

Turning to FIG. 11, there is a flow diagram of a query based methodology 1100 that facilitates notifying a user when the set of query results have changed in some way. The method 1100 involves generating at least one query at 1110 and obtaining the results for the query at 1120. At 1130, the query can be stored and/or monitored for changes with respect to the set of results. At 1140, a new object may be created by the user or received from another user. This object may satisfy the query and therefore be added to the set of results for the query. The user can be notified of the change to the set of results at 1150.

In practice, for instance, imagine that the query is kept on the user's desktop screen as an icon. When the results to the query have changed (and the change is detected), the icon can undergo a noticeable change such as flash, blink, change color, or light up. Alternatively, a message can be communicated to the user via a messaging service (email, instant message, etc.) or a pop-up message to let the user know of the change.

Queries can be shared in at least two different ways. In the first, a snapshot of the query and/or query results can be shared with one or more other users. This means that the current set of objects returned by the query are shared with (e.g., electronically transmitted or communicated to) the recipient; however no further processing is done. If the set of objects returned by the query changes, the recipient is not notified of the changes. In the second, the current set of query results is shared with the recipient as well as any future changes that may occur to the set of results returned by the query. The user can set a time limit for the query to stand (e.g., 1 hour, 3 days, 6 months, etc.). The recipient may or may not be notified of such a time limit for standing query. If the recipient's acceptance policy is more restrictive than the time limit imposed by originating user, then the recipient's policy can take priority and override the user's time limit.

The type of notification the originating user or recipient receives when a change has been detected can depend on the type of change. Notification can occur when a change causes an object to be added to the set of query results; when an object is deleted or removed from the set of query results; and when an object that is or is not a part of the query results changes but such change does not effect a transition of the object. Furthermore, shared objects can be unshared by the originating user especially when only a metadata listing was shared with the recipient and not the actual objects.

Figure 12:
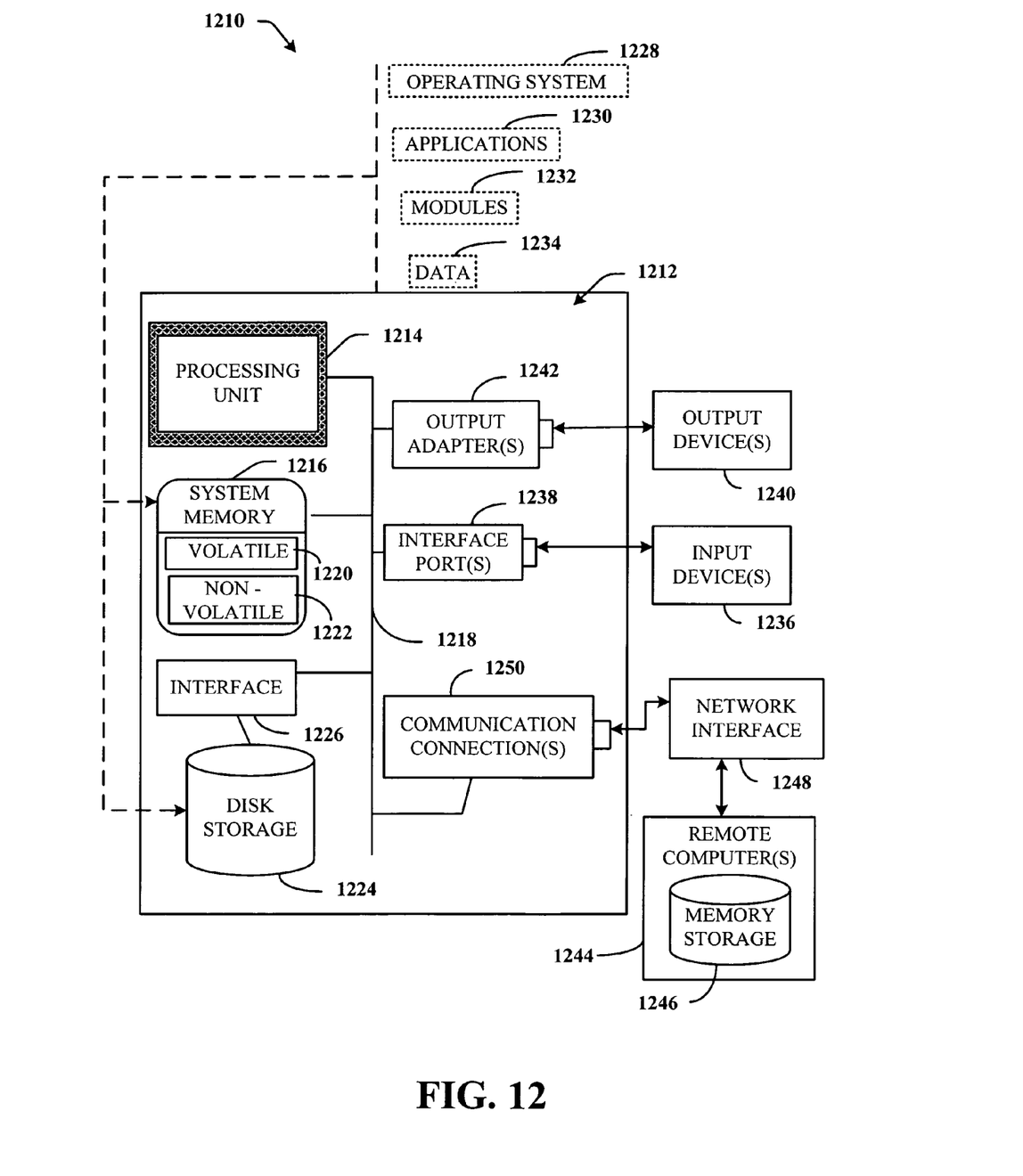
FIG. 12 illustrates an exemplary environment for implementing various aspects of the invention.

In order to provide additional context for various aspects of the subject application, FIG. 12 and the following discussion are intended to provide a brief, general description of a suitable operating environment 1210 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the system and/or method includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject system and/or method can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A query-based data management system that facilitates sharing data among users, the system comprising:
   a memory;
   a plurality of objects, each object being associated with at least one property;

a query engine that processes one or more queries based in part on metadata associated with each object and that returns a set of query results;

a sharing component that allows a user to designate the objects associated with the set of query results to be shared with at least one recipient, the sharing component notifies the at least one recipient if the objects associated with the set of query results are updated based on a modification to the objects, wherein the modification to the objects are recorded in a change record component that creates a change record that includes an initial state of the objects and each subsequent state of the objects; and an object analysis component that compares the initial state of the objects with the subsequent state of the objects in the change record to determine if the objects should remain in the set of query results based on a type of modification made to the objects, if the type of modification takes the objects outside the scope of the query, then the objects are removed from the set of query results.

2. The system of claim 1 further comprises a tag assignment component that allows the user to annotate each object with at least one tag before queries are processed.

3. The system of claim 1, the standing query allows the recipient to access additional objects that subsequently satisfy the query whenever there is any change to the query.

4. The system of claim 1, further comprises at least one query database that stores the at least one query for later access to the respective query results.

5. The system of claim 1, further comprises a query generation component that generates one or more queries based at least in part on metadata selected by a user.

6. The system of claim 1, the plurality of objects is a plurality of local objects on a computing device.

7. One or more computer-readable storage media capable of storing computer executable instructions that when executed by a processor implement a method comprising:

associating at least one property with each of a plurality of objects; processing one or more queries based in part on metadata associated with each object, the processing includes returning a set of query results for each object; designating the object associated with the set of query results to be shared with at least one recipient;

notifying the at least one recipient if the objects associated with the set of query results are updated based on a modification to the objects, wherein the modification to the objects are recorded in a change record component that creates a change record that includes an initial state of the objects and each subsequent state of the objects;

comparing the initial state of the objects with the subsequent state of the objects in the change record to determine if the objects should remain in the set of query results based on the a type of modification made to the objects; and removing the objects from the set of query results if the type of modification takes the objects outside the scope of the query.

\* \* \* \* \*